United States Patent [19]

Nagano et al.

[11] 3,875,393

[45] Apr. 1, 1975

[54] DIGITAL SERIAL ARITHMETIC UNIT

[75] Inventors: Akira Nagano, Nagaokakyo; Kazuaki Urasaki, Mukou; Masatugu Miura, Kyoto, all of Japan

[73] Assignee: Omron Tateisi Electronics Co., Ltd., Kyoto, Japan

[22] Filed: Dec. 20, 1972

[21] Appl. No.: 316,900

[30] Foreign Application Priority Data

Dec. 21, 1971 Japan .............................. 46-104452
Dec. 21, 1971 Japan .............................. 46-104453
Dec. 24, 1971 Japan .............................. 47-349
Dec. 28, 1971 Japan .............................. 47-969

[52] U.S. Cl. .............................................. 235/176
[51] Int. Cl. .............................................. G06f 7/50
[58] Field of Search .......... 235/176, 159; 340/324 R

[56] References Cited

UNITED STATES PATENTS

| | | | |
|---|---|---|---|
| 3,391,391 | 7/1968 | Simpson, Sr. | 235/159 X |
| 3,454,750 | 7/1969 | Shimabukuro | 235/159 |
| 3,641,330 | 2/1972 | Hatano et al. | 235/159 |
| 3,692,990 | 9/1972 | Kurokawa et al. | 235/159 |
| 3,707,622 | 12/1972 | Hatano et al. | 235/176 |
| 3,757,097 | 9/1973 | Kuijsten | 235/159 |

*Primary Examiner*—Charles E. Atkinson
*Assistant Examiner*—David H. Malzahn
*Attorney, Agent, or Firm*—Craig & Antonelli

[57] ABSTRACT

A data processing device which essentially comprises a shift register having a plurality of series-connected stages, each of which is composed of a plurality of bit cells, at least one of which bit cells is adapted to store a first information and the remaining bit cells are adapted to store a second information. Information signals stored in the respective stages of the shift register emerge therefrom by means of gate elements to be triggered on during corresponding timings for arithmetic operation of calculation and positional shift.

10 Claims, 23 Drawing Figures

DIGITAL SERIAL ARITHMETIC UNIT

Figure 1:
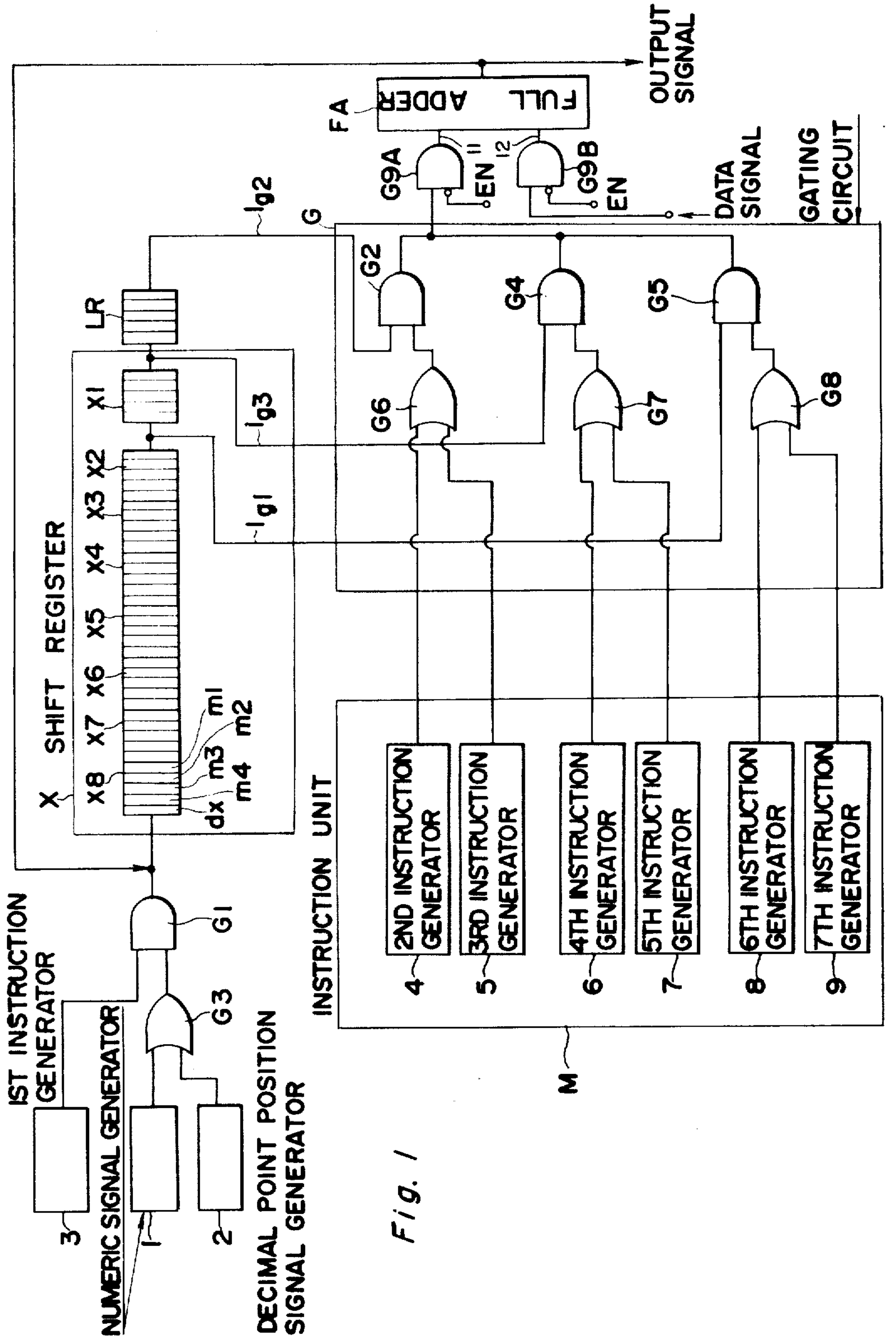

The present invention relates to a data processing device and, particularly, to a simple and convenient data processing device capable of performing transference or arithmetic operation relative to the data signals which consist of two different kinds of information signals such as indicative of numeric information and decimal point information signals.

In a conventional data processing device, such as an arithmetic circuit employed in an electronic calculator, in order to store the numeric information and decimal point position information, various arrangements are known. According to one of these conventional arrangements, two shift registers are arranged independently so as to store the numeric information and decimal point position information, respectively. In this case, it is disadvantageous in that various gates which act to transfer the information to other circuits or to shift a place of the digit of the numeric and/or decimal point are necessitated for each shift register and, therefore, the number of the gates increases which results in the increase of the manufacturing costs.

According to another one of the conventional arrangements, there is provided one serial shift register having a plurality of stages each of which consists of a plurality of bit cells for storing binary coded signals indicative of the numeric information and, thus the numeric and decimal point position informations are stored in any of the stages, respectively. In this case, it is also disadvantageous in that, since the decimal point position information is stored in the shift register in the form of binary coded signals, various auxiliary circuits such as decoding circuit which decodes the binary coded signals into the decimal form for transferring and/or shifting the place of the decimal point are necessitated other than the various gates and, therefore, circuit arrangement is complicated and not less inexpensive.

While recently various kinds of electronic calculators have been required in the market and, for example, from the point of view of the capacity of the calculator, an electronic calculator capable of giving the arithmetic results consisting of 8, 10, 12 or 14 decimal digits has become required.

On the other hand, recently large scale integrated circuits (LSI) have been employed in an arithmetic circuit or others of an electronic calculator to reduce the size of the calculator. It is well understood that the cost of manufacture of one LSI chip can reduce in proportion to the increase of the number of the LSI chips which are produced.

Accordingly, it is one way for reducing the cost of manufacture of the LSI chips to make the LSI chips available in versatile purposes so that the LSI chips can be employed in various types of calculators of which the maximum number of digits processable thereby is different from one another.

For this purpose, a change-over means which act to change the number of the stages of the shift register and/or number of the stages of a digit timing signal generator of which digit timing signals are utilized for shifting contents stored in the shift register, may be incorporated in the LSI chip so as to select the number of digits which is predetermined relative to the specification of the calculator.

However, it is noted that, in the event that such change-over system is introduced in any one of the first and second mentioned arrangements for storing the numeric and decimal point position informations, there are disadvantages in that a plurality of sets of the change-over means or other auxiliary circuits are necessitated.

Accordingly, an essential object of the present invention is to provide a simple and convenient data processing device which substantially eliminates the disadvantages inherent in the conventional arrangement of similar character.

Another object of the present invention is to provide a simple and compact data processing device which employs a relatively small number of gates and the operations for transferring or shifting the place of the data are simple.

A further object of the present invention is to provide a simple and compact data processing device which is capable of easily changing the maximum number of the decimal digits to be processed thereby.

According to the present invention, gate means for shift and transfer operations are provided in association with a serial shift register comprising a plurality of stages, each composed of at least one bit cell for storage of decimal point information or first information and several bit elements for storage of numeric information or second information, the gate means being opened upon application of timing pulses thereto, for the purposes of shift or transfer of the first and/or second informations. The gate means provided serve for shift or transfer operations of both the first and the second informations, and the number of gates is accordingly less than that required in the conventional devices.

Furthermore, the numeric information are represented by the binary coded signals consisting of bit timing signal *t*1 through *t*4, each of which signal has the weights of $2^0$, $2^1$, $2^2$ and $2^3$, and the decimal point position information is represented by bit timing signal *t*5 which appears subsequent to the bit timing signal *t*4. In this arrangement, the numeric signals are stored in first through fourth bit cells and decimal point position signal is stored in the fifth bit cell which is connected in series with the fourth bit cell in the same stage of the serial shift register.

However, it is to be noted that certain disadvantages arise when a conventional full adder is employed in the data processing device according to the present invention. For example, when addition of [1001] and [0111], i.e., (9 + 7), is to be performed, the result will be [10000]. Accordingly, a carry signal "1" appears at the fifth bit, namely, this carry signal "1" appears in the bit timing *t*5. This means that the carry signal "1" is unnecessarily stored in the fifth bit cell of the shift register, whereby a confusion between the numeric signals and the decimal point information signal occurs.

Accordingly, it is a related object of the present invention to provide a full adder which can be utilized in the data processing device according to the present invention.

One of the advantages obtainable by the present invention resides in that a luminance interference, which occurres in a figure display system employed in an electronic calculator, is effectively prevented. The term "luminance interference" stands for the occurrence in which a certain figure indicating discharge tube displays a digit superimposed with a different digit which is to be displayed through another figure indicating discharge tube located right or left to the discharge tube which has displayed the superimposed digits. This luminance interference is caused by the deformation of waveform of pulse signal as well understood by those skilled in the art. The known circuit arrangement for preventing the luminance interference is very complicated and the luminance efficiency is relatively low, for example, 3/4.

However, by the application of the present invention, the circuit arrangement for this purpose becomes much simple, as will become apparent from the later description.

Figure 2:
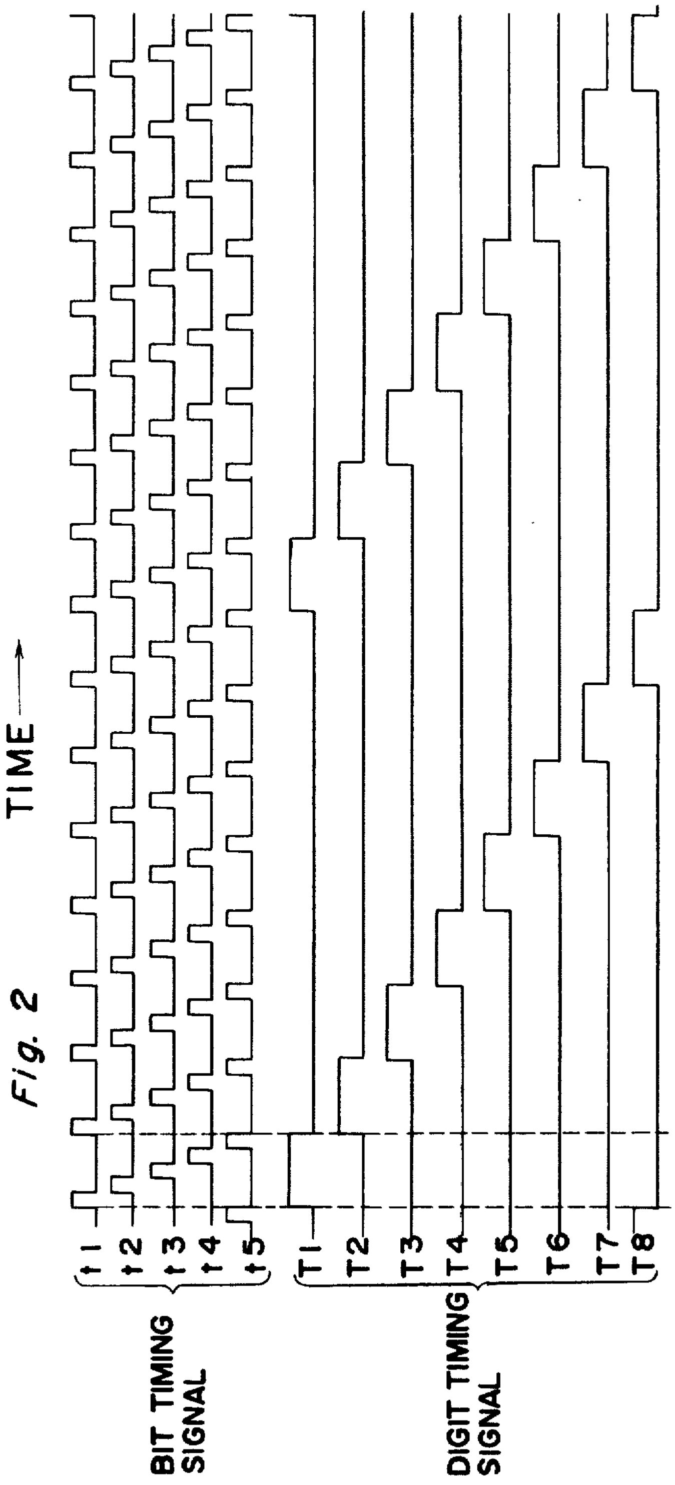
Figure 3:
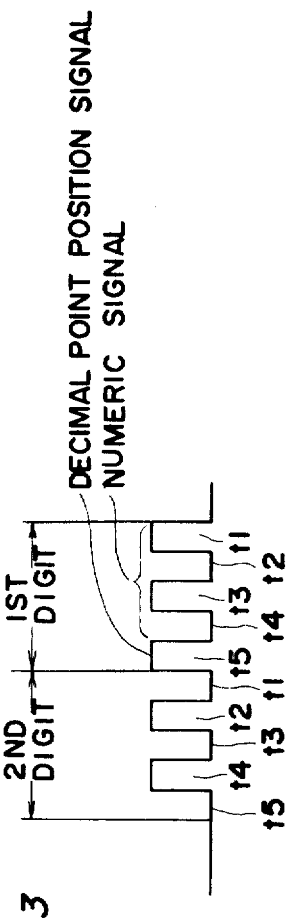
Figure 4:
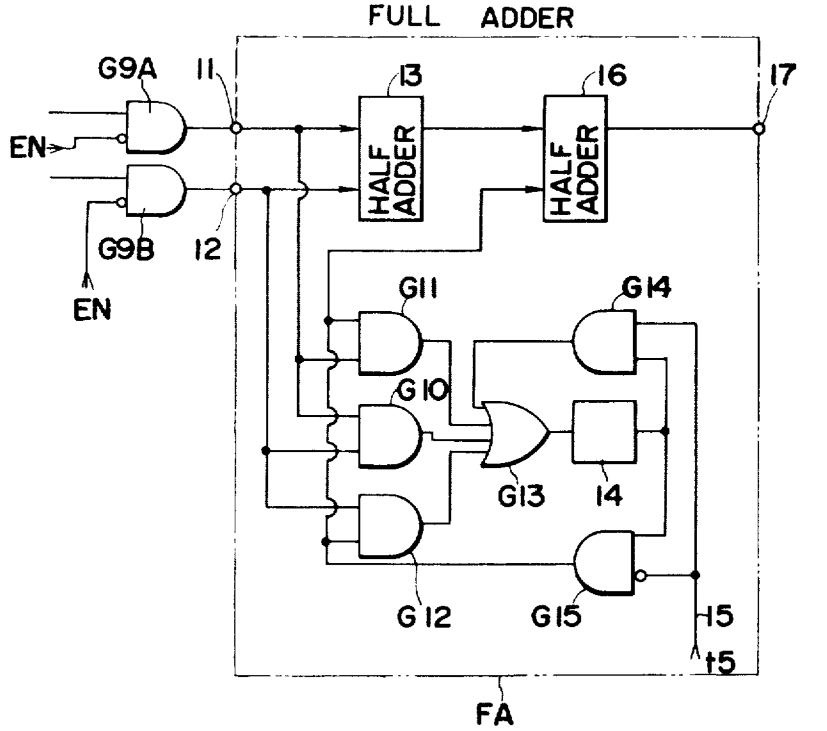
Figure 10:
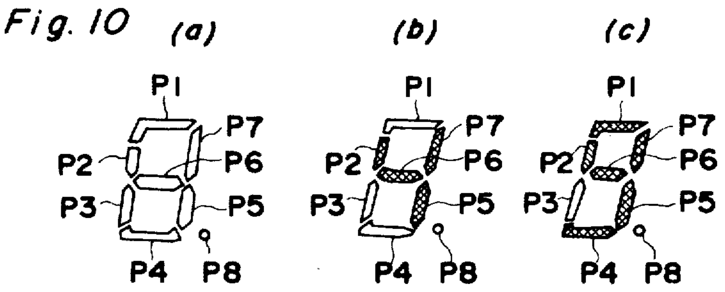
Figure 5:
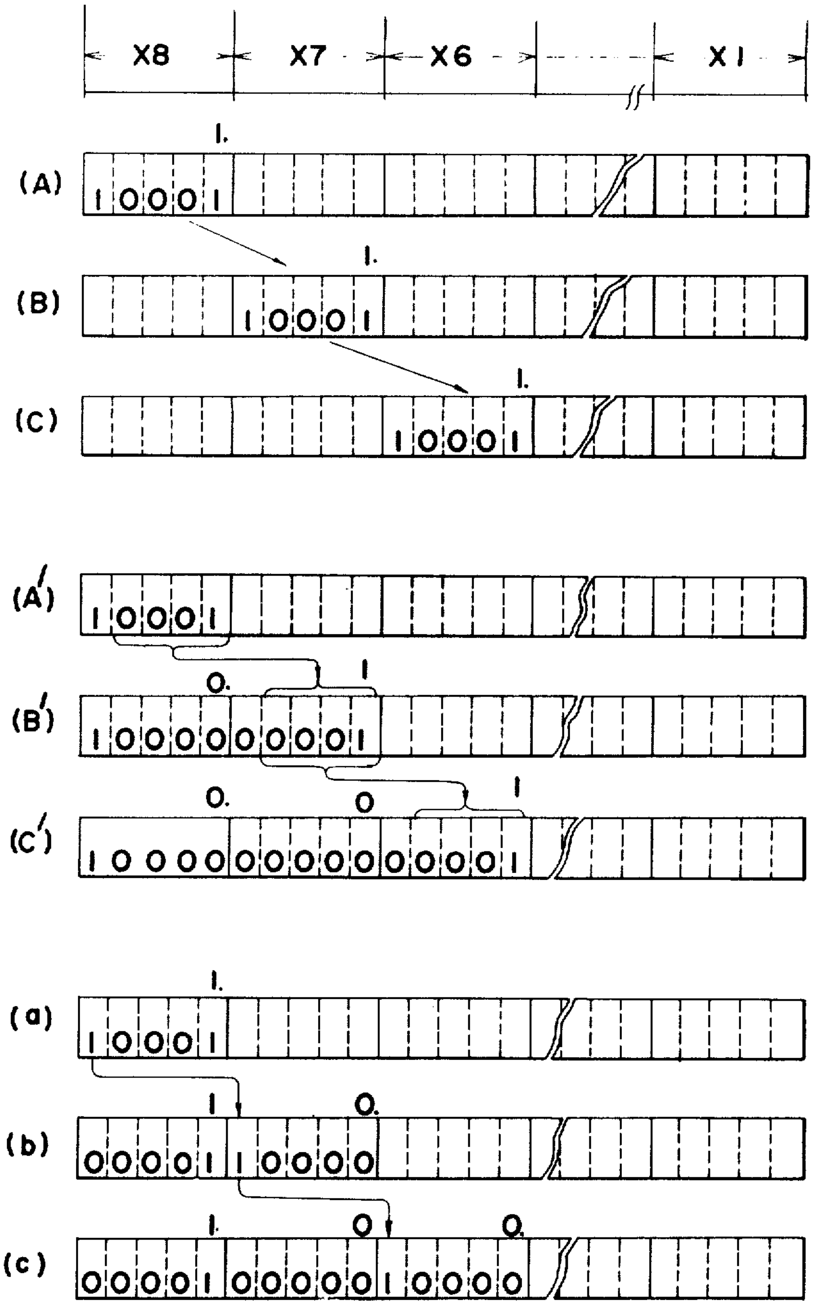
Figure 6:
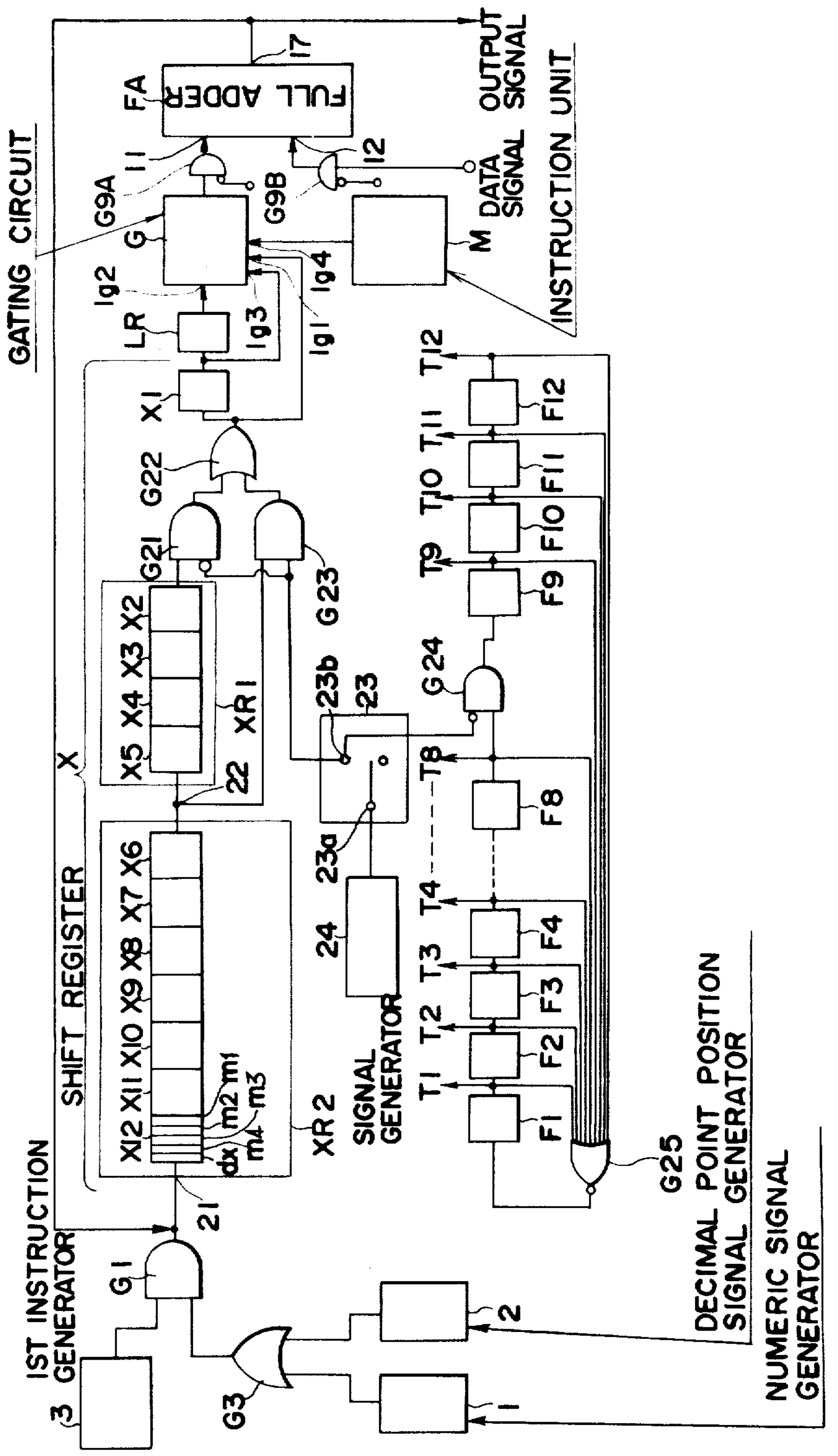
Figure 7:
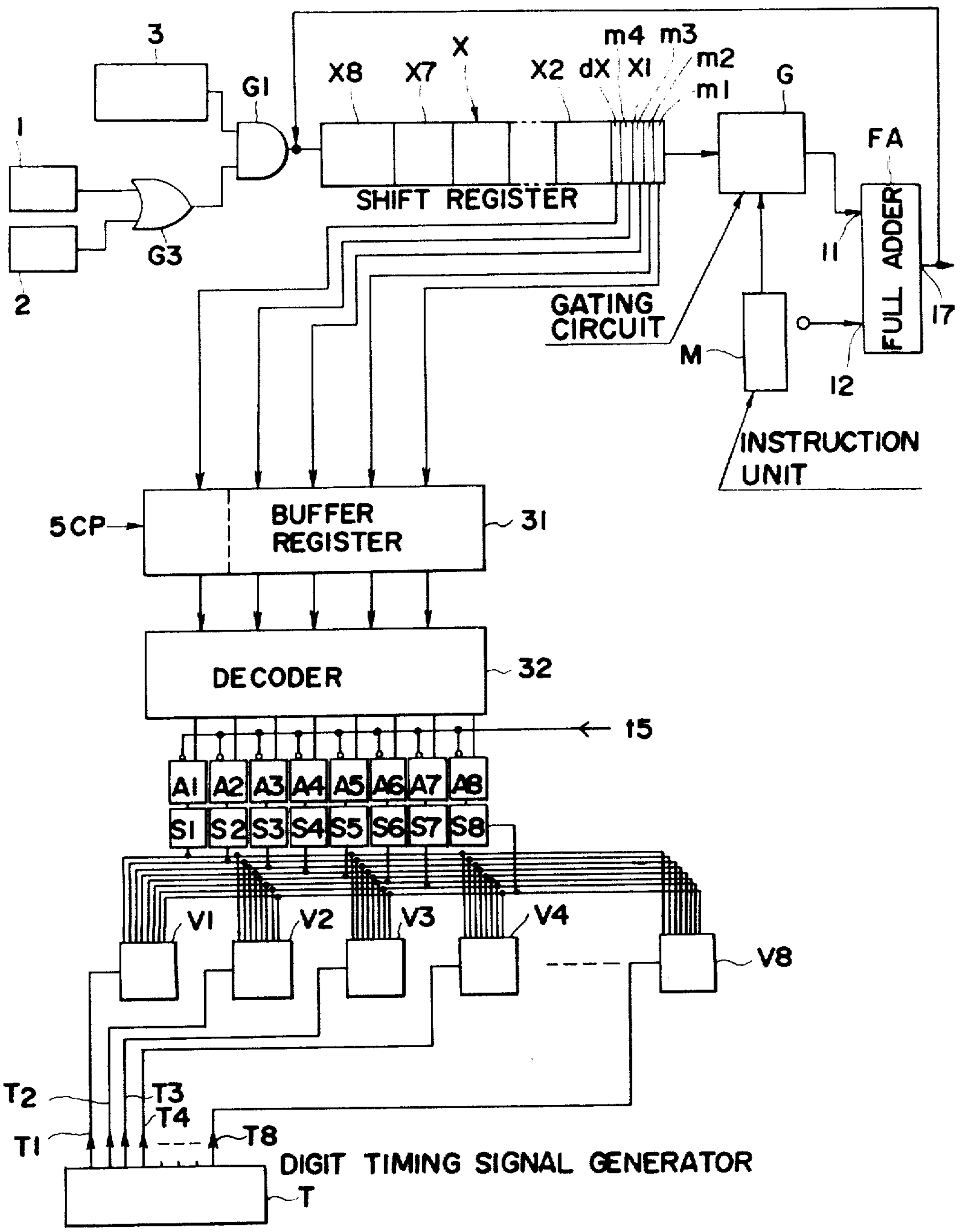
Figure 8:
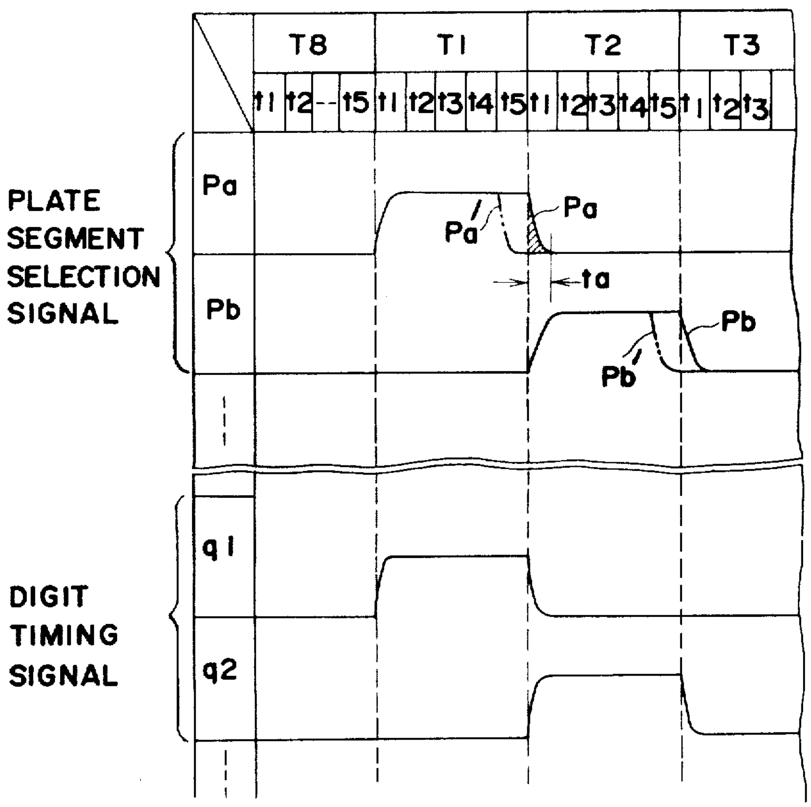
Figure 9:
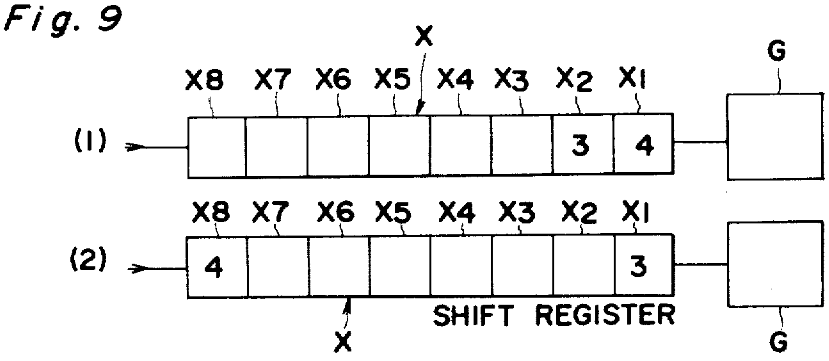
Figure 11:
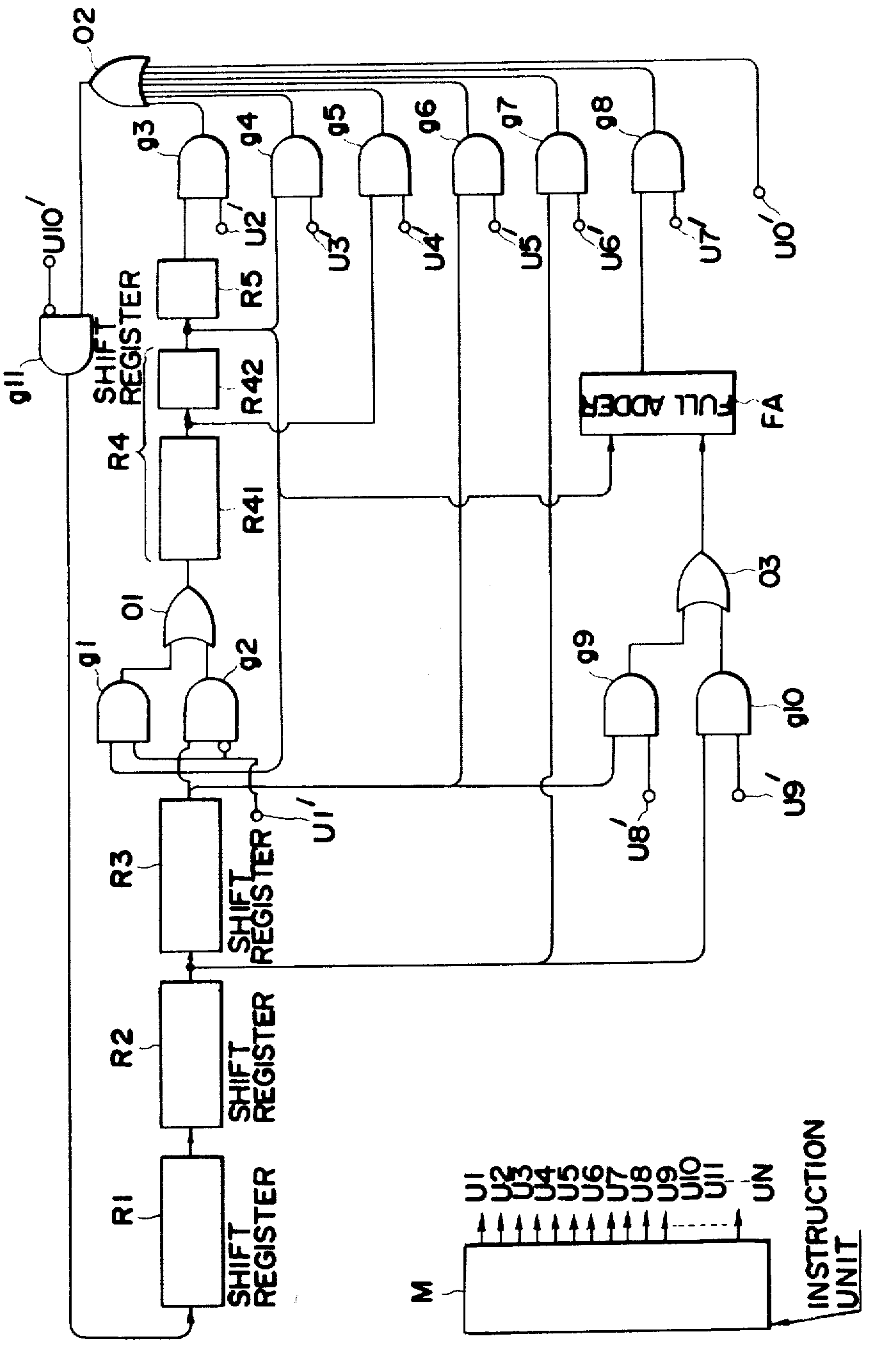

These and other objects and features of the present invention will become apparent from the following description taken in conjunction with preferred embodiments thereof with reference to the accompanying drawings, in which;

FIG. 1 shows a schematic logic circuit diagram of one embodiment of the present invention, FIG. 2 is a timing chart of various timing signals employed in the data processing device in general, FIG. 3 is a schematic diagram showing wave forms of the data signals employed in the data processing device of the present invention, FIG. 4 is a schematic logic circuit diagram showing a full adder employed in the data processing device of FIG. 1, FIG. 5 shows an example of manner of shift of the numeric and decimal point position informations in a specific digit timing, wherein FIG. 5(A), FIG. 5(B) and FIG. 5(C) show one example that numeric and decimal point position informations are shifted one place rightwards, FIG. 5(A'), FIG. 5(B') and FIG. 5(C') show another example that only numeric information is shifted rightwards, and FIG. 5(*a*), FIG. 5(*b*) and FIG. 5(*c*) show a further example that only decimal point position information is shifted rightwards, FIG. 6 is a schematic block diagram showing another embodiment of the present invention, FIG. 7 is a schematic block diagram showing a further embodiment of the present invention, FIG. 8 is a schematic diagram showing various wave forms of the plate segment selection signals and digit timing signals which are utilized in the embodiment of FIG. 7, FIG. 9(1) and FIG. 9(2) show displacement of the digit stored in a shift register employed in the embodiment of FIG. 7, FIG. 10(*a*) is a schematic diagram showing an arrangement of plate segments used in a figure indicator tube shaped to represent any one of decimal digits zero through nine, FIG. 10(*b*) is a schematic diagram showing an example of which any of the plate segments are lit, FIG. 10(*c*) is a schematic diagram showing an example of luminance interference, and FIG. 11 is a schematic block diagram showing an electronic calculator in which a data processing device according to the present invention is employed.

Before the description of the present invention proceeds, it is to be noted that, for the sake of brevity, like parts are designated by like reference numerals throughout the several views of the accompanying drawings. It is also to be noted that the terms "bit timing $ti$", "digit timing $Ti$" (wherein $i$ is an integer except for zero) and "word timing" are to be understood as designating respective periods during which a bit timing signal $ti$, a digit timing signal $Ti$ and a word timing signal are generated.

Referring to FIG. 1, a serial shift register X of dynamic type having eight stages $x1$, $x2$, . . . . $x7$ and $x8$ is disposed between an AND gate G1 and an AND gate G2. Each stage $x1$ through $x8$ of the register X consists of five bit cells $m1$, $m2$, $m3$, $m4$ and $dx$, which are connected in series, so as to store the decimal point signal corresponding to any one of the places of the numeric information to be processed other than the numeric information which are represented by binary coded signals of four bits.

However, it is to be noted that according to the present invention, the data signals which are composed of the numeric signals and the decimal point position signal are serially disposed relative to the time by every place of the digits in such manner that the former signals appear at any one of the bit timings $t1$ through $t4$ and the latter signal appears at the timing $t5$ relative to any of the digit timing T1 through T8 as shown in FIG. 3.

Accordingly, the cells $m1$ through $m4$ of each stage are effective to store the numeric information, while the cell $dx$ is effective to store the decimal point information.

The contents, i.e., the numeric signals and decimal point position signal, stored in the register X are shifted from one bit cell to another bit cell which is adjacently disposed and from a stage to another stages in response and to clock pulses Cp1 and Cp2 (not shown), the bit timing signals $t1$ through $t5$ and the digit timing signals T1 through T8 by the known manner. In addition, the contents stored in the shift register X are circulated from the output terminal of the register X to the input terminal thereof through various gating means as hereinafter described.

Said numeric signals and/or decimal point position signal are applied to the input terminal of the register X through an OR gate G3 and the AND gate G1 from a numeric signal generator 1 and decimal point position signal generator 2, respectively. These generators 1 and 2 may be input circuits which are provided in an electronic desk top calculator for producing various information signals in response to the operation of each numeric or decimal point key disposed in the keyboard of the calculator.

The AND gate G1 is controlled by the input signals applied from a first instruction generator 3 which generates high level signals in a period during which the data signals produced from the signal generators 1 or 2 are to be transferred to the shift register X.

An output terminal of the shift register X or the output terminal of the stage $x1$ is connected to an input terminal of a shift register LR of 5-bits and an input terminal of an AND gate G4. The output terminal of the shift register LR is connected to an input terminal of the AND gate G2. Said shift register LR consists of five bit cells $m1$ through $m4$ and $dx$ as same as the stage $x1$ of the shift register X. A junction point between the stage $x2$ and $x1$ is connected to an input terminal of an AND gate G5.

The output terminals of respective AND gate G2, G4 and G5 are connected to the input terminal of the inhibit gate $G9_A$ of which output terminal is connected to an input terminal 11 of a full adder FA. An inhibit input terminal of the inhibit gate $G9_A$ receives an signal EN which is generated at the bit timing *t5* when the arithmetical operation is performed in the full adder FA.

Another input terminal 12 of the full adder FA is adapted to receive 5-bit numeric signals which are fed from another shift register (not shown) through an inhibit gate $G9_B$.

The output terminal of the full adder FA is connected to the input terminal of the shift register X, so that the contents stored in the shift register X can be fed back to the input terminal thereof through any one of the AND gates G2, G4 or G5 and the full adder FA as hereinafter described. The full adder FA is provided with a correction circuit (not shown) of the type, for example, disclosed in U.S. Pat. No. 3,584,206, so as to constitute a BCD full adder.

Another input terminal of the AND gate G2 are adapted to receive a "left shift signal" through an OR gate G6 from either a second instruction generator 4 or a third instruction generator 5. Said second instruction generator 4 generates high level signals at the timing *t5*, in a period during which the position of the decimal point of the contents stored in the shift register X is to be shifted one or more places leftwards. Similarly, the third instruction circuit 5 generates high level signals at the timing *t1* through *t4* in a period during which the digits of the contents stored in the shift register X are to be shifted one or more places leftwards.

Another input terminal of the AND gate G4 are adapted to receive a "circulation signal" through an OR gate G7 from either a fourth instruction generator 6 or a fifth instruction generator 7. Said fourth instruction generator 6 generates high levels at the timing *t5* in a period during which the information of the decimal point position of the contents stored in the shift register X is merely to be circulated so as to be stored in the shift register X, similarly, the fifth instruction circuit 7 generates high level signals at the timing *t1* through *t4* in a period during which the digits of the contents stored in the shift register X are merely to be circulated so as to be stored therein.

Another input terminal of the AND gate G5 are adapted to receive a "right shift signal" through an OR gate G8 from either a sixth instruction generator 8 or a seventh instruction generator 9. Said sixth instruction generator 8 generates high level signals at the timing *t5* in a period during which the position of the decimal point of the contents stored in the shift register X is to be shifted one or more places rightwards. Similarly, the seventh instruction generator 9 generates high level signals at the timing *t1* through *t4* in a period during which the digits of contents stored in the shift register X are to be shifted one or more places rightwards.

FIG. 4 shows an embodiment of the full adder FA which is employed in the data processing device shown in FIG. 1.

In FIG. 4, input terminals 11 and 12 are connected separately to both input terminals of a half adder 13 and to both input terminals of an AND gate G10. The input terminal 11 is further connected to one input terminal of an AND gate G11 and the input terminal 12 is connected to one input terminal of an AND gate G12. The outputs of the AND gates G10, G11 and G12 provide inputs to an OR gate G13 whose output terminal is connected to a 1-bit delay circuit 14. The output terminal of the delay circuit 14 is connected to one input terminal of an AND gate G14 and to an input terminal of an inhibit circuit G15. Reference numeral 15 is a line for carrying the bit timing signal *t5* in every digit timing and is connected to the other input terminal of the AND gate G14 and to the inhibit input terminal of the inhibit gate G15. The output terminal of the AND gate G14 connected to the OR gate G13, and the output terminal of the inhibit gate G15 is connected to the other input terminals of the AND gates G11 and G12. Reference numeral 16 is a half adder whose input terminals are connected, respectively, to the output terminal of the inhibit gate G15 and the sum output terminal of the half adder 13.

17 is the output terminal of the full adder FA and is connected to the output terminal of the half adder 16.

The explanation of the operation of the data processing device constructed as above mentioned will be hereinafter described.

Assuming now that no signal is applied to the input terminal 12 of the full adder FA, and that the data to be processed consist of a decimal number [1] in combination with a decimal point, and therefore, the signals of the data are represented by [10001]. Under the such conditions, the decimal point signal and the numeric signals [10001], for the sake of brevity, the contents are hereinafter represented as [1.], are stored in the respective cells *dx*, *m*4, *m*3, *m*2 and *m*1 of the stage *x*8 of the shift register X at the bit timing *t1* in the digit timing T1 as shown in FIG. 5(A).

The contents stored in the shift register X are transferred in the shift register X in response to the bit timing signals *t1* through *t5* and the digit timing signals T1 through T8, and at the timing T8, the contents [1.] reach the stage X1.

When the fourth and fifth instruction generator 6 and 7 generate high level signals "1", these signals "1" are applied to the input terminal of the AND gate G4 through the OR gate G7 at the every bit timing *t5* and *t1* through *t4*, respectively, whereby the AND gate G4 opens and allows the contents [1.] to pass through to the full adder FA.

The contents [1.] thus applied to the full adder FA pass through both half adders 13 and 16, and appear at the output terminal 17 of the full adder without any arithmetic operations since no signal is applied to the input terminal 12. The outputs of the full adder, i.e., the contents 1.] are fed back to the input terminal of the stage X8 of the shift register X, whereby the contents [1.] are recirculated and stored in the shift register X. The contents [1.] are circulated once in 1 word timing which is equal to the sum of the digit timing T1 through T8; and in subsequent word timing also the contents are similarly circulated by being moved along the shift register X and passed through the AND gate G4 and full adder FA.

According to this first operation as abovementioned, each of the digits and decimal point are maintained at the same place of the shift register X so far as the same digit timing in every word timing concerns.

To shift the contents [1.], which are stored in the stage X8 during a digit timing T1 included in a arbitral word timing period, one stage to the rightwords with respect to a digit timing T1 which is included in another word timing, the right shift signals, namely the high level signals "1" are produced from the sixth and seventh instruction generator 8 and 9.

These high level signals are applied to the AND gate G5 through the OR gate G8 for one word period, thus opening the AND gate G5, with the result, when the contents [1.] reach the stage X2 at the digit timing T7, the contents [1.] are derived from the output terminal of the stage X2 and are fed to the input terminal of the AND gate G5. The contents thus applied to the AND gate G5 are allowed to pass through to the full adder FA, whereby the contents [1.] appear at the output terminal of the fulladder FA and are fed to the stage X8 of the shift register X at the subsequent digit timing T8.

The contents [1.] thus stored in the stage *x*8 are transferred to the adjacent stage *x*7 by the subsequent digit timing signal T1, in other words, when the digit timing T1 comes round again, the contents [1.] have been shifted one stage to the rightwards as illustrated in FIG. 5(B).

If the high level signals of the sixth and seventh instruction generators 8 and 9 are given in the subsequent word timing, the contents [1.] skip the stage *x*1, as before, resulting in a shift of one further stage to the rightwards as shown in FIG. 5(C).

To shift the contents [1.] one stage to the leftwards, in reverse to the above-described right shift, the left shift signal, namely, the high level signals generated from the second and third instruction generator 4 and 5 are applied through the OR gate G6 to the AND gate G2 for one word timing, then the AND gate G2 opens. And, therefore, the contents [1.] stored in the stage X8 in the digit timing T1 can be circulated through said AND gate G2. However, it is noted that the contents stored in the shift register go through the whole stages X8 through X1 and further additional five bits shift register LR.

The contents [1.] are fed back to the input terminal of the stage X8 through the AND gate G2 and full adder FA in the digit timing T2 included in the subsequent word timing delayed by one digit timing by passing through the additional register LR. In other words, the contents stored in the shift register X are shifted one stage to the leftwards.

The above explanation was in reference to shifting digits and decimal point together; shift of the numeric information only stored in the stage X8 in the digit timing T1 is obtained by the signals from the relevant instruction generator 4 through 9 to the corresponding gates as hereinafter described.

For example, to shift only the numeric information one stage right, the high level signals fed from the seventh instruction generator 9 are applied to the AND gate G5. Since the signals of the seventh instruction generator 9 are applied only in the bit timing periods *t*1 through *t*4, the AND gate G5 is opened in the bit timing periods *t*1 through *t*4, but closed in the bit timing period *t*5. On the other hand, when the high level signals of the fourth instruction generator 6 are applied to the AND gate G4 only in every bit timing period *t*5, the AND gate G4 opens in the bit timing *t*5 of each digit timing, and the dicimal point is therefore circulated normally through the stage X8 → X7 → .... X2, X1 → AND gate G4 → the full adder FA → the stage X8, in the specified order, thus, being stored again in the stage X8 in the subsequent period T1; but the numeral information [1] (0001 in binary notation) skips stage X1, and is circulated around the path: the stage X8 → X7 → .... X2 → the AND gate G5 → the full adder FA → the stage X8, and, in the next period T1 the content [1] is stored in the stage X7, the resulting situation being as illustrated in FIG. 5(A') and 5(B'). A further rightwards shift of the numeric information only can be obtained in the further subsequent word timing also by emission of similar instructions in which case, in the following period T1, the contents of shift register X would be as shown in FIG. 5[C'].

To shift the decimal point one stage rightwards, but not the numeric information [1], the high level signals are emitted by the sixth instruction generator 8. These high level signals are passed through the OR gate G8 and supplied to the AND gate G5. As these pulses are emitted only in the bit timing *t*5, the AND gate G5 opens only in the bit timing *t*5, and is closed in the timing *t*1 through *t*4. On the other hand, the high level signals are emitted by the fifth instruction generator in the bit timings *t*1 through 14 of each digit timing, the AND gate G4 opens in the bit timing *t*1 through *t*4 and closes in the timing *t*5. The numeric information [1] is therefollows the path X8 → X7 → .... X2 → THE AND gate G5 → the full adder FA → X8, thus skipping the stage X1, and, in the next period T1, is stored digit timing T1, while the decimal point information follows the path X8 → X7 → .... X2 → the AND gate G5 → the full adder FA → X8, thus skipping the stage X1, and, in the next period T1, is stored in the stage X7, as illustrated in FIG. 5(*a*) and 5(*b*). The decimal point can be shifted one further stage to the right by emission of the same instructions in the succeeding word timing, in which case the contents of shift register X in the following period T1 would be as shown in FIG. 5(*c*).

The operation for individual leftward shift of numeric or decimal point information is analogous to that of rightward shift, and explanation thereof is therefore omitted.

To transfer the contents stored in the shift register X to other shift register (not shown), a gate, which is adapted to receive the outputs of the full adder FA, and the AND gate G4 are opened in a suitable timing.

In the foregoing, to simplify the explanation, the various instruction generators were described as separate structures; it is, however, perfectly possible, of course, for them to formed as one unit, employing a read-only memory, for example.

The following description is made to explain the operations of the data processing circuit of the present invention, particularly, of the full adder FA shown in FIG. 4 under the condition that both data signals concerning the respective input terminals 11 and 12 of the full adder FA are present. In this case, it is assumed that these input data signals appearing at the input terminals 11 and 12 are decimal numbers (9) and (7); respectively, i.e., [01001] and [00111] in the BCD form.

However, it is noted that these BCD signals [01001] and [00111] are supplied to the both input terminal of the full adder FA bit by bit beginning from the rightmost bit signals in response to the bit timing signals *t*1 through *t*5 in the order. Accordingly, at a bit timing *t*1 of the digit timing T1, the input terminals 11 and 12 of the full adder FA receive the signals "1", respectively, and the signals are subsequently applied to the input terminals of the half adder 13 thereby to produce the output "0" at the sum output terminal of the half adder 13. And the content of the 1 bit delay circuit 14 is "0". Then there is no input to the inhibit input terminal of the inhibit gate G15, whereby the output of the inhibit gate G15 is "0". Therefore, input to any of these terminals of the half adder 16 is "0", and the output of the half adder 16 is "0". In other word, at the bit timing $t1$, the output of the full adder Fa is "0". On the other hand, an input of "1" is impressed at the both input terminals of the AND gate G10, thereby to produce an output "1" which is passed through the OR gate G13 and stored as "1" in the 1-bit delay circuit 14.

In the bit timing $t2$, input to the input terminal 11 is "0", and input to the terminal 12 is "1", and the sum output of the half adder 13 is therefore "1".

Further, other than during the bit timing $t5$, there is no input to the inhibit input terminal of the inhibit gate G15, so that the carry signal "1" stored in the 1-bit delay circuit 14 appears at the output terminal of the inhibit gate G15. The outputs of the inhibit G15 are applied to the input terminals of the AND gates G11 and G12 and the half adder 16. The input signal "1" fed from the terminal 12 is applied to the another input terminal of the AND gate G12. Hence, the AND gate G12 produces an output, "1", which passes through the OR gate G13 and stored in the 1-bit delay circuit 14. Inputs to the half adder 16 are the sum output "1" fed from the half adder 13 and the carry signal "1" fed from the inhibit gate G15 and, therefore, the half adder 16 produces an output "0".

Similarly, in the bit timing $t3$, input at the input terminals 11 and 12 are "0" and "1", respectively, and, therefore, the output of the half adder 13 is "1". And, there is a carry signal "1" at the input terminal of the full adder 16 while the output of the half adder 16 is "0". Hence, in the bit timing $t3$, "0" is produced at the output terminal 17 of the full adder FA, and carry signal "1" is stored in the 1-bit delay circuit 14.

In the bit timing $t4$, inputs to the terminals 11 and 12 are "1" and "0", respectively, and, hence, the output signal of the half adder 13 is again "1". Also, the AND gate G11 receives the input signal "1", fed from the input terminal 11, and a carry "1" which is produced from the inhibit gate G15 of which input signal is fed from the 1-bit delay circuit 14. Thus, the output of the AND gate G11 is "1", which output is passed through the OR gate G13 and stored in the delay circuit 14. The input terminals of the half adder 16 respectively receive the sum output "1" from the half adder 13 and the carry signal "1" which is the output of the inhibit gate G15 and, accordingly, the sum output of the half adder 16 is "0".

The bit timing $t5$ is the time for pulses indicative of a decimal point. However, it is noted that even if contents to be applied to the full adder FA accompany a decimal point signal, the decimal point signal cannot be applied to the input terminals 11 and 12 of the full adder FA. This is because both inhibit gates G9A and G9B are brought into the inhibit condition by the bit timing signal $t5$. Accordingly, at the bit timing $t5$, the sum output of the half adder 13 is "0". On the other hand, the bit timing signal $t5$ is applied through the line 15 to the inhibit input terminal of the inhibit gate G15. Hence, the carry signal "1" in the delay circuit 14 can not be obtained at the output terminal of the inhibit gate G15. Therefore both of the input terminals of the half adder 16 are "0", and the sum output of the half adder 16 is "0".

In the bit timing $t5$, the AND gate G14 receives a carry "1" from the delay circuit 14 at one input terminal and the bit timing signal $t5$ at the other input terminal, and the AND gate G14 produces an output signal "1", which is passed through the OR gate G13 and stored in the delay circuit 14.

In the bit timing $t1$ of the subsequent digit timing T2, inputs to both terminals 11 and 12 are "0", respectively, and the sum output of the half adder 13 is "0". On the other hand, the inhibit gate G15 is opened again to generate the carry signal "1" in response to the output of the delay circuit 14. The half adder 13 has, therefore, inputs "0" and "1", thereby to produces the sum output "1" and an output "1" can be therefore obtained at the output terminal 17 of the full adder FA in the bit timing $t1$ of the digit timing T2. In the event that inputs to both terminal 11 and 12 are "0", the outputs of the AND gate G10, G11 and G12 are "0" and the contents of the delay circuit 14 is also "0". Thus, [1001] and [0111] are added to give [10000], but the carry from the fourth-bit is not stored in the fifth-bit but is taken to the first-bit of the next digit.

The explanation of the embodiment of the invention given above has been made in reference to the case where decimal point information is stored in the fifth-bit; it is however, possible, of course, to store this information in the first-bit, in which case a pulse would be applied along the line 15 in bit timing $t1$.

Also, inhibiting of the carry need not be for 1 bit timing only, but can be for 2, 3 or as many bit periods as required, application of bit timing pulses along line 15 being selected so as to cause the carry the skip the requisite number of bits.

In such cases, 1 digit timing would contain 6, 7 . . . bit timing.

FIG. 6 shows another embodiment of the present invention in which the maximum number of the digits to be processed is easily changeable.

Referring now to FIG. 6, a shift register X has a plurality of stages $x1$ through $x12$, the construction being substantially similar to the stage $x1$ through $x8$ of the shift register X shown in FIG. 1, which are divided into three portions $x1$, $x$R1, $x$R2. The portion XR1 consists of stages $x2$ through $x5$, while the portion $x$R2 consists of the stages $x6$ through $x12$.

Each stage, for example, the stage X12, is composed of cells $m1$, $m2$, $m3$, $m4$ and $dx$ which are corresponding to five bits.

These five cells of each stage are connected in series. The cells $m1$ through $m4$ of each stage are effective to store the numeric information, while the cell $dx$ effective to store the decimal point information.

The serial registers XR1 and XR2 are connected with each other in series and are, for example, a known dynamic shift register respectively. The information stored in the shift register X is shifted by clock pulses (not shown) and is memorized, circulating through a circulating path. The period required for the information to be shifted through one cell to another is equal to each of bit timing signals $t1$ through $t5$ as shown in FIG. 2. Therefore, the time required for the information to be shifted through one stage to another in the shift register is equal to each of the digit timing signals T1 through T12 which are generated in the manner of digit timing signals T1 through T8 as shown in FIG. 2.

Reference numeral 21 is an input terminal of the shift register X, to which the data signals are applied. The output terminal of the shift register XR1, namely, the output terminal of the stage $x2$, is connected with one input terminal of an inhibit gate G21. The output terminal of the inhibit gate G21 is connected to an input terminal of the stage $x1$ of the shift register X through an OR gate G22. The output terminal of the OR gate G22 is also connected to the input terminal $I_{g1}$ of the gating circuit G of which construction is the substantially same to that of the gating circuit G shown in FIG. 1.

The output terminal of the stage $x1$ is connected to the input terminal $I_{g3}$ and the 5-bit delay shift register LR of which output terminal is connected to the input terminal $I_{g2}$ of the gating circuit G.

On the other hand, a connetion point 22 between the output terminal of the stage $x6$ and the input terminal of the stage $x5$ is connected to an input terminal of an AND gate G23 of which output terminal is connected to another input terminal of the OR gate G22.

Reference numeral 23 is a change over switch for changing over the maximum number of digit to be processed between 8 digits to 12 digits. A contact point *23a* of the change-over switch 23 is connected to an output terminal of an signal generator 24 which generates a continuous high level signal for 8-digit operation. Another contact point *23b* of the change-over switch 23 is connected to another input terminal of the AND gate G23 and inhibit input terminals of respective inhibit gates G21 and G24.

F1 through F12 are flip-flop circuits of delayed type. The flip-flop circuits F1 through F8 are connected in series, while the flip-flop circuits F9 through F12 are likewise connected in series. The output terminal of the flip-flop circuit F8 is connected, through the inhibit Gate G24, with the input terminal of the flip-flop circuit F9.

Furthermore, the output terminal of each flip-flop circuit F1 through F12 is connected through a NOR gate G25 with the input terminal oof the flip-flop circuit F1. High level signals stored in any of the flip-flop circuit F1 through F12 are shifted one by one in response to every fifth clock pulse 5CP included in the clock pulses CP (not shown) which are utilized to generate the bit timing signals t1 through t5.

In this arrangement, a ring counter is composed of the flip-flop circuit F1 through F12 (or F1 through F8) and the NOR gate G25, and the digit timing signal T1 through T12 (or T1 through T8) can be generated.

In the circuit constructed as described above, when the switch 23 is conditioned to connect the point *23a* to *23b*, the high level signals fed from the signal generator 24 are applied to the input terminal of the AND gate G23, and to the inhibit input terminal of the inhibit gate G21 and the inhibit gate G24, whereby the AND gate G23 is opened and the inhibit gates G21 and G24 are closed. Therefore, the information which is stored in the shift register XR2 is shifted and circulated in the following path; the stage $x12$ → the stag $x11$ to $x6$ → the AND gate G23 → the OR gate G22 → the stage $x1$ → the gating circuit G → the full adder FA → the stage $x1$.

In this case, the shift register for storing the data information is composed of eight stages $x12$, $x11$, . . . . $x6$, and $x1$. Since in the digit timing signal generator the inhibit gate G24 is closed, the flip-flop circuits F9 through F12 are separated. An eight-stage ring counter is composed of the flip-flop circuits F1 through F8 and the NOR gate G25, and ready to generate the digit timing signals T1 through T8.

Accordingly, the data processing device shown in FIG. 6 is capable of processing the data having up to eight digits.

When the switch 23 is conditioned to open the circuit between the point *23a* and *23b*, no high level signals from the signal generator 24 are applied to the respective inhibit input terminals of the inhibit gates G21 and G24 and the input terminal of the AND gate G23. Therefore, the shift register XR2 and the shift register XR1 are connected in series with each other, and the information stored in the shift register XR2 is shifted and circulated in the following path; the stages X12 to $x2$ → the inhibit gate G21 → the OR gate G22 → the stage $x1$ → gating circuit G → the full adder FA → the stag $x12$.

In this case, the register for storing the data signals is composed of twelve stages. Also, the flip-flop circuit F8 is connected with the flip-flop circuit F9 through the inhibit gate G24. And the flip-flop circuits F1 through F12 are connected in series, composing the ring counter of twelve stages with the NOR gate G25, whereby the digit timing signals T1 through T12 can be generated.

Of course, in arrangement shown in FIG. 6, the numeric signals and decimal point position signal which are applied to the shift register X are constructed in the same configuration as shown in FIG. 3.

In addition, the circulation, rightwards or leftwards shift of the contents and arithmetical operations between two data signals applied to the both input terminals of the full adder FA can be performed in a substantially similar manner as herein before described in conjunction with the embodiment shown in FIG. 1, and are therefore omitted for the sake of brevity.

From the foregoing, it is apparent that acccording to the data processing device of the FIG. 6, the maximum digits of the data to be processed are easily changed whether or not the high level signal is applied to the point *23b*.

However, it is noted that when the device shown in FIG. 6 is fabricated in an LSI chip employed for an electronic calculator, the point *23b* may be merely an input terminal pin of the LSI chip, and a high or low level signal may be selectively applied to the terminal pin in accordance with whether the LSI chip is employed for the 8-digits electronic calculator or 12-digit electronic calculator.

Accordingly, it is an advantage of the embodiment of FIG. 6 that the LSI chip which comprises such a device as shown in the embodiment of the FIG. 6 of the present invention can be effectively used for 8 or 12 digit capacity calculator. Needless to say, the number of digits is not limited only to the number 8 or 12 but the desired number of the digit can be selected.

FIG. 7 shows a still further embodiment of the present invention, which is capable of effectively preventing the luminance interference from occuring between two figure indicating tubes.

In FIG. 7, $V_1$, $V_2$, . . . . $V_8$ are fluorescent indicator tubes, each of which possesses plate (anode) segments $P_1$, $P_2$, . . . . $P_8$, a grid (control electrode) and a cathode. It is of course possible for the tube to have a common cathode or for individual tubes to be multi-unit tubes.

Said plate segments $P_1$ through $P_8$ of the indicator tube are disposed as shown in FIG. 10 in the known manner and a desired figure or a decimal point are displayed in response to the plate segment selection signals which are selectively applied to any of the segments is a shift register of which construction and operation are substantially the same as those of the shift register X shown in FIG. 1.

31 is a buffer register which is connected to receive the outputs of the cells *dx*, $m_4$, $m_3$, $m_2$, $m_1$ of the stage $x_1$ of the shift register X, and whose contents are read out in response to every clock pulse 5*cp* emitted every 5th clock pulse of the clock pulse *cp*. These clock pulses are not shown in the drawings.

32 is a binary-to-decimal decoder that receives output pulses of the buffer register 31 corresponding to binary-coded date stored in the buffer register 31 and converts them to decimal format, and supplies pulses for the selection of indicator tube plate segments corresponding to the decoded decimal values.

$A_1$ . . . . $A_8$ are inhibit (anticoincidence) gates, each with two input terminals, one which receives indicator tube plate segment selection pulses from the decoder 32 and another, the inhibiting input terminal, which receives *t*5 bit timing signal.

S1 . . . . S8 are plate segment operating circuits each of which output terminal is connected to corresponding plate segments of each indicator tube V1 through V8, and which, on receipt of plate segment selection pulses from the inhibit gates A1 . . . . A8, supply high level pulses to raise the potential of the relevant indicator tube plate segments.

T is a circuit for emission of digit timing signal T1 . . . . T8, which are applied individually, through suitable connections, to the control electrodes of the indicator tubes V1 . . . V8, respectively.

Below is given an explanation of the operation of the embodiment of FIG. 7.

It is asumed that no bit timing signal *t*5 is applied to the inhibiting input terminals of the inhibit gates A1 . . . A8, i.e., where full wave of each of the segment selection pulse are applied to any of the indicating tubes V1 through V8 and accordingly, the luminance interference is not eliminated.

Further, it is assumed that the shift register X is storing the number 34, which situation is illustrated in FIG. 9; the number 34 would, of course, be in binary coded decimal representation (0011) and (0100).

Taking the contents of the register X to be as shown in FIG. 9(1) in digit timing T1 the contents stored in the cells *m*4, *m*3, *m*2, *m*1 of stage X1 of the register X are (0100) (the decimal point in the cell *dx* is discussed later). This (0100) is read into the buffer register 31, which produces a corresponding output which is impressed in the decoder 32, from where plate segment selection pulses are applied to the inhibit gates A1 . . . . A8 to actuate the relevant indicator tube plate segments for displaying the figure (4). In this case, the plate segment selection pulses from the decoder 32 are such that '1' (high level) output pulses are obtained from inhibit gates A2, A6, A5 and A7 only, this output actuates the plate segment operating circuits S2, S6, S5 and S7, and high level pulses are impressed on the plate segments P2, P6, P5 and P7 of the indicating tubes V1 through V8.

An ideal segment selection signal is such a rectangular wave that a high level signal appears only in predetermined one digit timing, for examples digit timing T1.

However it is noted that wave form of the segment selection signals is, in practice, somewhat deformed as shown by Pa in FIG. 8. In other words, the wave form has leading and trailing edges, one of which appears undesirably in a subsequent digit timing, for example, digit timing T2.

Also, a timing pulse T1 is applied to the grid of indicator tube V1 from the digit timing signal generator T, the wave-form being as shown at *q*1 of FIG. 8. Thus, while the potential of the plate segments P2, P6, P5 and P7 of all the indicator tubes is held high, the only tube whose grid is held high is V1 and whose segments P2, P6, P5 and P7 therefore light up to display the figure (4), as illustrated in FIG. 10(*b*).

In the subsequent digit timing T2, storage in the register X is shifted as shown in FIG. 9(1), and the cells *m*4, *m*3, *m*2 and *m*1 of stage X1 store (3) in binary code, i.e., (0011). This (0011) is stored in the buffer register 31 and then supplied as corresponding input pulses to the decoder 32, which to actuate plate segments P1, P7, P6, P5 and P4, supplies a '1' as input to the inhibit gates A1, A7, A6, A5 and A4, whose output actuate plate segment operating circuits S1, S7, S6, S5 and S4, whereby high level pulses are applied to the indicator tubes' plate segments P1, P7, P6, P5 and P4. P*b* shown in FIG. 8 illustrates the wave-form of these pulses applied to the plate segments; similarly to P*a*, the wave-form P*b* tails.

Further, a timing signal T2 is applied to the grid of the indicator tube V2 from the digit timing signals generator T, the wave-form of the pulse being as shown by the wave *q*2 in FIG. 8. Hence, while the plate segments P1, P7, P6, P5 and P4 of all the indicator tubes are held at high level. Accordingly, the segments P1, P7, P6, P5 and P4 of the indicator tube V2 are lit and, therefore, the figure (3) is displayed by the indicator tube V2.

This is shown by the crossing portion in the FIG. 10(*c*).

However, it is noted that the segment P2 of the indicator tube V2 is also lit during the period ta corresponding to the tail of the wave of the signal pa.

Accordingly, the segment P2 is lit faintly other than the segment P1, P7, P6, P5 and P4 which are normally lit. Then, the luminance interference occurs.

However, when the bit timing signal *t*5 is applied to the inhibit terminal of the inhibit gates A1 through A8, the inhibit gates A1 through A8 are brought into the inhibit condition in each bit timing *t*5. Accordingly, even if the plate segment selection signals P*a* or P*b* are present at the output terminals of the decoder 32, all the plate segment P4 through P8 of each tube V1, V2 . . . . V8 are held at low level every bit timing *t*5. Therefore, the wave forms of the signal P*a*' or P*b*' applied to the plate segments are such configurations as shown by dotted line in the FIG. 8.

From the foregoing, it is apparent that these plate segment selection signals P*a*' and P*b*' do not appear in the timing T2 and T3, respectively, whereby undesired segment P2 of the indicator tube V2 is not lit, in the aforementioned examples, so that the luminance interference is effectively prevented. Moreover, it is apparent that, so long as the abovementioned operation is repeated in rapid sequence, the number "34" can be displayed and perceived by the human eyes without any difficulty in identifying number "34".

It is an advantage that the luminance efficiency is maintained at 4/5 so that sufficient brightness of the displayed figures can be obtained, since display of the indicator tubes are adapted to disappears only 1/5 period of one digit timing in every digit timing.

In order to display a decimal point of which signal is stored in the cell $dx$ of the stage $x1$ and appears at the bit timing $t5$, this decimal point signal is stored in the buffer register 31 during one digit timing, whereafter the decimal point signal "1" is adapted to be applied to the segment P8 of the indicator tube, which is a segment for displaying decimal point, thereby to cause lightening thereof.

Other operations to display the decimal point are substantially the same as the operations to display the segment P1 through P7.

While the above explanation was with reference to the embodiment employing fluorescent electronic indicator tubes for display, the invention has, of course, many other applications, for example, for forming character display patterns with photo-emissive diodes.

Although, in the above mentioned embodiment, the pulse duration 6f the plate segment selection signal is shortened at the end portion thereof corresponding one bit timing signal $t5$, so as to present the luminance interference, it is possible to shorten the duration of the each digit timing pulse which is applied to each of the control grid of the indicator tube or to shorten either of the durations of the selection signal and the timing signal.

FIG. 11 is a block diagram showing a still further embodiment of an electronic calculator in which the data processing device according to the present invention is employed.

This electronic calculator includes a plurality of the shift registers, each of which construction and operation is substantially the same as those of the shift register X shown in the FIG. 1.

In FIG. 11, R1, R2, R3 and R4 are seriesconnected shift registers, each of which possess the same number of stages and is composed of 5 bits, 1 bit for decimal point and 4 bits for numeric information. $g1, g2 \ldots g10$ and $g11$ are gates which open or close in response to the various signals they receive from a master instruction emitting unit M; 01, 02 and 03 are OR gates; and FA is a full adder.

The gate gl acts to recirculate through the register R4 itself the contents stored in the shift register R4 upon receipt of an instruction signal which is fed from the instruction signal generator unit M. The gate $g2$ is opened while the instruction signal U1 is not applied.

The gate $g3$ acts to add a 5-bits serial shift register R5 to the shift register R1, R2, R3, and R4, which are connected in series to each other, thereby to shift the contents stored in any of the registers R1 through R4 leftwards. This gate $g4$ can be opened upon receipt of the signal u2 for shifting the contents leftwards at the input terminal u2'.

The gate $g4$ acts to circulate the contents which is stored in any of the register R1 through R4, through the all shift registers. R1 through R4. This gate $g4$ is opened upon receipt of the signal U3 for "circulating normally" at the input terminal U3'. When this gate g3 opens various contents are circulated in the following path; the register R1 → register R2 → register R3 → gate g2 → or gate 01 → register R4 → gate $g4$ → or gate 02 → gate $g11$ → register R1 in response to the timing signals.

The gate $g5$ acts to shift the contents stored in any of the shift register rightwards. When this gate is opened, a circulating path of which one stage R42 of the shift register R4 is removed from the normal path, is completed. This gate $g5$ is opened by the instruction signal U4 for "shifting the contents one place rightwards", which is fed from the innstruction unit M and is received at the input terminal U4'. Gate $g5$ is a gate which, when opened by a "shift one place rightwards" instruction pulse U4 from the master unit M to its terminal U4', makes possible a one-place rightwards shift of the contents of the registers R1 . . . R4 by cutting out a 1-stage section R42 of the register R4 from the circulation path described above.

Gates $g6$ and $g7$ open for transfer of the contents stored in the registers R3 and R2 respectively to register R1, and gates $g9$ and $g10$ open for the contents of registers R3 and R2 respectively to be supplied to one input terminal of the full adder FA, the gates being opened by pulses U5, U6, U8, U9 fed from the instruction unit M and, applied to respective input terminals U5', U6', U8', U9'.

Gate $g8$ opens, on receipt of a 'sum' instruction pulse U7 from the instruction unit M at its input terminal U7', in order to enter into register R1 the result of full adder FA's addition of the input supplied to it from register R4 and through OR gate 03.

Gate $g11$ is normally open, but is closed by input of a 'clear' instruction pulse U10 at its terminal U10', for clearing (setting to 0) contents stored in the register. UO' is a terminal for input, from an external source, of numeric information for storage in the registers. Opening or closing of the gates in FIG. 11 can be effected in the digit timing period; also, these operation of the gates can be performed relative to the numeric information, in the bit timing $t1 \ldots t4$ only, or to the decimal point information, in the bit timing $t5$ only, as described above with reference to FIG. 1.

From the foregiong full description, one of the other features of the present invention resides in that transference and shift of the numeric information and those of the decimal point position information are independently performed by the provision of the signal gate arrangements.

Another one of the other features of the present invention resides in that, since the decimal point position information can be stored in a single and common shift register, which concurrently acts to store the numeric information, with said position information being represented by a digit timing available upon generation of the decimal point position signal from the output stage of the shift register, the output signal from said shift register can be directly utilized to drive the figure indicator tubes, and, therefore, the necessity of the decoder for decoding the decimal point position signal can be substantially eliminated.

What is claimed is:

1. A data processing device which comprises a shift register having a plurality of series-connected stages, each of which is composed of a plurality of bit cells, at least one of the cells for storing a first information and the remaining cells for storing a second information; circulation path means connected between the input and the output of said shift register; means for shifting the content stored in said shift register from one bit to another and from one stage to another; said circulation path means including gate means for passing said first information therethrough during a timing corresponding to said first information and for passing said second information therethrough during a timing corresponding to said second information; and said circulation path means further including full adder having an input for receiving the second information from said shift register via said gate means, said full adder for performing an arithmetic operation of calculation between said second information received thereby and information applied to another input of said full adder; said full adder comprising a first half adder having a pair of input terminals for respectively receiving two binary coded informations to be added to each other, a first AND gate having a pair of input terminals for respectively receiving said binary coded informations, a second AND gate having one input terminal for receiving one of said binary coded informations and another input terminal for receiving a carry signal, a third AND gate having one input terminal for receiving the other of said binary coded informations and another input terminal for receiving said carry signal, a one-bit delay circuit responsive to an output signal from any one of said first, second and third AND gates for delaying said output signal for a period of time corresponding to one bit thereby to subsequently generate a one-bit delayed carry signal, a second half adder having a pair of input terminals for respectively receiving an output signal from said first half adder and said carry signal from said one-bit delay circuit, an inhibit gate element for inhibiting the application of the carry signal from the one-bit delay circuit to said second and third AND gates and said second half adder for a predetermined bit timing, and a gate element capable of feeding the one-bit delayed carry signal back to the input of said one-bit delay circuit for maintaining said carry signal for a period of time corresponding to said bit timing.

2. A data processing device as claimed in claim 1, wherein said first and second informations are indicative of decimal point position and numeric values, respectively.

3. A data processing device which comprises a shift register having a plurality of series-connected stages, each of which is composed of a plurality of bit cells, at least one of the cells for storing a first information and the remaining cells for storing a second information; circulation path means connected between the input and the output of said shift register; means for shifting the content stored in said shift register from one bit to another and from one stage to another; said circulation path means including first gate means for passing said first information therethrough during a timing corresponding to said first information and for passing said second information therethrough during a timing corresponding to said second information; said circulation path means further including a full adder having an input for receiving the second information from said shift register via said first gate means, said full adder for performing an arithmetic operation of calculation between said second information received thereby and information applied to another input of said full adder; said full adder including a second gate means connected between an output terminal of the m-th stage m places rightwards from the first or input stage of said shift register, wherein m is an integer, and the last or output stage of said shift register for permitting the passage of a signal from said m-th stage to said output stage of said shift register therethrough in response to a signal applied to an input terminal of said second gate means; and a third gate means connected between the n-th stage n places rightwards from the input stage of said shift register, wherein n is an integer, and the output stage of said shift register for permitting the passage of a signal from said n-th stage to said output stage of said shift register therethrough in response to a different signal applied to an input terminal of said third gate means, whereby, when said second gate means is conditioned to permit said passage, the data processing device processes the data information corresponding to m digits and, when said third gate means is conditioned to permit said passage, the data processing device processes the data information of n digits.

4. A data processing device which comprises a shift register having a plurality of series-connected stages, each of which is composed of a plurality of bit cells, at least one of the cells for storing a first information and the remaining cells for storing a second information; means for shifting the content stored in said shift register from one bit to another and from one stage to another; another shift register connected with said shift register and having one stage composed of the same number of bit cells as that of any of the stages of said shift register; a first AND gate means having a pair of input terminals, one of which receives a signal from the stage next to the output stage of said shift register and the other of which receives a signal generated either during a timing corresponding to the first information or during a timing corresponding to the second information when the content stored in said shift register is to be shifted rightwards; a second AND gate means having a pair of input terminals, one of which receives an output signal from the output stage of said shift register and the other of which receives a signal generated either during the timing corresponding to the first information or during the timing corresponding to the second information when the content stored in said shift register is to be circulated from the input stage to the output stage thereof; a third AND gate means having a pair of input terminals, one of which receives an output signal from said another shift register and the other of which receives a signal generated either during the timing corresponding to the first information or during the timing corresponding to the second information when the content stored in said shift register is to be shifted leftwards; a full adder having an input for receiving an output signal from any one of said first to third gate means for performing an arithmetic operation of calculation between said output signal received thereby and information applied to another input of said full adder; and means for applying the output from said full adder to said input of said shift register; said full adder comprising a first adder having a pair of input terminals for respectively receiving two binary coded informations to be added to each other, a first AND gate having a pair of input terminals for respectively receiving said binary coded informations, a second AND gate having one input terminal for receiving one of said binary coded informations and another input terminal for receiving a carry signal, a third AND gate having one input terminal for receiving the other of said binary coded informations and another input terminal for receiving said carry signal, a bone-bit delay circuit responsive to an output signal from any one of said first, second and third AND gates for delaying said output signal for a period of time corresponding to one bit thereby to subsequently generate a one-bit delayed carry signal, a second half adder having a pair of input terminals for respectively receiving an output signal from said first half adder and said carry signal from said one-bit delay circuit, an inhibit gate element for inhibiting the application of the carry signal from the one-bit delay circuit to said second and third AND gates and said second half adder for a predetermined bit timing, and a gate element for feeding the one-bit delayed carry signal back to the input of said one-bit delay circuit for maintaining said carry signal for a period of time corresponding to said bit timing.

5. A data processing device as claimed in claim 4, wherein said first and second informations are indicative of decimal point position and numeric values, respectively.

6. A data processing device which comprises a shift register having a plurality of series-connected stages, each of which is composed of a plurality of bit cells, at least one of the cells for storing a first information and the remaining cells for storing a second information; circulation path means connected between the input and the output of said shift register; means for shifting the content stored in said shift register from one bit to another and from one stage to another; said circulation path means including gate means for passing said first information therethrough during a timing corresponding to said first information and for passing said second information therethrough during a timing corresponding to said second information; said circulation path means further including a full adder having an input adapted for receiving the second information from said shift register via said gate means, said full adder for performing an arithmetic operation of calculation between said second information received thereby and information applied to another input of said full adder; a display section coupled to said shift register and including a plurality of figure indicator tubes each comprising a plurality of first electrodes shaped to illuminate an information corresponding to the content of the information to be displayed and at least one control electrode; generator means for generating digit timing signals, each of which has the duration corresponding to five bit timings, for successively driving said figure indicator tubes in accordance with the content of the information to be displayed; means for decoding the information stored in said shift register and for generating a drive signal for selectively driving said first electrodes of said figure indicator tubes in response to said digit timing signal thereby to permit said display section to display the decoded information; and means for limiting the duration of a signal supplied to said control electrode of each figure indicator tube at one of the beginning and end of said duration in a period of time corresponding to one bit period.

7. A data processing device as claimed in claim 6, wherein said full adder comprises a first half adder having a pair of input terminals for respectively receiving two binary coded informations to be added to each other, a first AND gate having a pair of input terminals for respectively receiving said binary coded informations, a second AND gate having one input terminal for receiving one of said binary coded informations and another input terminal for receiving a carry signal, a third AND gate having one input terminal for receiving the other of said binary coded informations and another input terminal for receiving said carry signal, a one-bit delay circuit responsive to an output signal from any one of said first second and third AND gates for delaying said output signal for a period of time corresponding to one bit thereby to subsequently generate a one-bit delayed carry signal, a second half adder having a pair of input terminals for respectively receiving an output signal from said first half adder and said carry signal from said one-bit delay circuit, an inhibit gate element for inhibiting the application of the carry signal from the one-bit delay circuit to said second and third AND gates and said second half adder for a predetermined bit timing, and a gate element capable of feeding the one-bit delayed carry signal back to the input of said one-bit delay circuit for maintaining said carry signal for a period of time corresponding to said bit timing.

8. A data processing device as claimed in claim 6, wherein said first and second informations are indicative of decimal point position and numeric values, respectively.

9. A data processing device which comprises a shift register having a plurality of series-connected stages, each of which is composed of a plurality of bit cells, at least one of the cells for storing a first information and the remaining cells for storing a second information; circulation path means connected between the input and the output of said shift register; means for shifting the content stored in said shift register from one bit to another and from one stage to another; said circulation path means including gate means for passing said first information therethrough during a timing corresponding to said first information and for passing said second information therethrough during a timing corresponding to said second information; said circulation path means further including a full adder having an input for receiving the second information from said shift register via said gate means, said full adder for performing an arithmetic operation of calculation between said second information received thereby and information applied to another input of said full adder; a display section coupled to said shift register and including a plurality of figure indicator tubes each comprising a plurality of first electrodes shaped to illuminate an information corresponding to the content of the information to be displayed and at least one control electrode; generator means for generating digit timing signals, each of which has the duration corresponding to five bit timings, for successively driving said figure indicator tubes in accordance with the content of the information to be displayed; means for decoding the information stored in said shift register and for generating a drive signal for selectively driving said first electrodes of said figure indicator tubes in response to said digit timing signal thereby to permit said display section to display the decoded information; and means for limiting the duration of a signal supplied to any of the first electrodes of each figure indicator tube at one of the beginning and end of said duration in a period of time corresponding to one bit period.

10. A full adder which comprises a first half adder having a pair of input terminals for respectively receiving two binary coded information to be added to each other; a first AND gate having a pair of input terminals for respectively receiving said binary coded information; a second AND gate having one input terminal for receiving one of said binary coded informations and another input terminal for receiving a carry signal; a third AND gate having one input terminal for receiving the other of said binary coded informations and another input terminal for receiving said carry signal; a one-bit delay circuit responsive to an output signal from any one of said first second and third gate means for delaying said output signal for a period of time corresponding to one bit thereby to subsequently generate a one-bit delayed carry signal; a second half adder having a pair of input terminals for respectively receiving an output signal from said first half adder and said carry signal from said one-bit delay circuit; an inhibit gate element for inhibiting the application of the carry signal from the one-bit delay circuit to said second and third AND gates and said second half adder for a predetermined bit timing; and a gate element for feeding the one-bit delayed carry signal back to the input of said one-bit delay circuit for maintaining said carry signal for a period of time corresponding to said bit timing.

* * * * *